United States Patent
Aerdts et al.

(10) Patent No.: US 6,970,803 B1
(45) Date of Patent: Nov. 29, 2005

(54) DETERMINING THE COMPLEXITY OF A COMPUTING ENVIRONMENT

(75) Inventors: Reinier J. Aerdts, Plano, TX (US); Thomas L. Hill, Dallas, TX (US); Theodore M. Page, Sterling Heights, MI (US); William H. Phifer, Downingtown, PA (US); David J. Schmid, Rochester Hills, MI (US); Brent L. Blackburn, Allen, TX (US)

(73) Assignee: Electronic Data Systems Corporation, Plano, TX (US)

( * ) Notice: Subject to any disclaimer, the term of this patent is extended or adjusted under 35 U.S.C. 154(b) by 32 days.

(21) Appl. No.: 10/280,082

(22) Filed: Oct. 25, 2002

(51) Int. Cl.[7] .............................................. G06F 17/60
(52) U.S. Cl. ...................... 702/179; 702/186; 702/183; 717/101
(58) Field of Search ........................ 702/179, 119, 123, 702/180–186, 187, 188, 128; 717/151, 154, 717/101, 102; 714/38, 11, 12, 1, 37; 709/223–225, 709/201, 202, 241, 226; 703/2, 21, 22; 706/908, 706/916, 919, 920, 932, 934; 705/7, 8; 718/104, 718/100; 707/3, 7; 710/38, 104, 8; 715/514

(56) References Cited

U.S. PATENT DOCUMENTS

| | | | |
|---|---|---|---|
| 6,519,660 B1 * | 2/2003 | Rooney | 710/38 |
| 6,651,244 B1 * | 11/2003 | Smith et al. | 717/154 |
| 6,658,643 B1 * | 12/2003 | Bera | 717/101 |
| 6,715,130 B1 * | 3/2004 | Eiche et al. | 715/514 |
| 2003/0033586 A1 * | 2/2003 | Lawler | 717/101 |

OTHER PUBLICATIONS

Hakala, H. "Evaluation of system components for mobile navigation applications", Sep. 11-13, 1989, IEEE, Vehicle Navigation and Information Systems Conference, 1989, pp. 17-21.*

Nemecek, S. "Weighted information flow", Apr. 11-14, 1996, IEEE, Southeastcon '96, 'Bringing Togehter Education, Science and Technology', pp. 699-702.*

* cited by examiner

*Primary Examiner*—Hal Wachsman
(74) *Attorney, Agent, or Firm*—Richard A. Mysliwiec

(57) ABSTRACT

Techniques are described for determining the complexity of a computing environment. The techniques include developing a model for the complexity of a computing environment based on the quantity of particular elements of the computing environment. The model includes two statistical weights for each element in the complexity model. One statistical weight is applied to each element to provide a complexity rating of the element. Another statistical weight is applied to each element to provide a complexity rating across all elements.

16 Claims, 13 Drawing Sheets

| COMPLEXITY ELEMENT DESCRIPTION | QUANTITY | COMPLEXITY GROUP | WITHIN-ELEMENT STATISTICAL WEIGHT | ACROSS-ELEMENT STATISTICAL WEIGHT | MAXIMUM WEIGHTED QUANTITY | ABSOLUTE COMPLEXITY INDEX | NORMALIZED COMPLEXITY INDEX |
|---|---|---|---|---|---|---|---|
| Number of locations to support (210) | 12 (250) | Medium (255) | 30 (260) | 5 (265) | 600 (270) | 0.6 (275) | 3.0 (280) |
| Degree of customization (220) | 175 (251) | High (256) | 50 (261) | 5 (266) | 8750 (271) | 1.0 (276) | 5.0 (281) |
| Number of different vendors in mainframe environment (230) | 28 (252) | Low (257) | 10 (262) | 8 (267) | 1400 (272) | 0.2 (277) | 1.6 (282) |
| TOTAL (240) | | | | | | | 9.6 (285) |

DETERMINING THE COMPLEXITY OF A COMPUTING ENVIRONMENT

TECHNICAL FIELD

This description relates to techniques for determining the complexity of a computing environment.

BACKGROUND

During the planning or the operation of a computing environment, an estimate of the number of people needed to operate the computing environment may be determined. A computing environment may include mainframe computers, mid-range computers, and distributed desktop computers. A computing environment may provide computing resources and services to one customer or organization or to more than one customer or organization. The estimate of the number of people needed to operate a computing environment may be measured in the amount of time required for a person to accomplish a unit of work. For example, the estimate may be expressed in terms of person-months or person-years needed to perform a task or a collection of tasks. A person-year also may be referred to as a full-time equivalent (FTE).

SUMMARY

In one general aspect, determining the complexity of a computing environment includes determining one or more quantities. Each quantity is associated with an element associated with a computing environment. A first statistical weight and a second statistical weight are applied to the one or more quantities. A complexity value for the computing environment is determined based on applying the first statistical weight and the second statistical weight to the one or more quantities.

Implementations may include one or more of the following features. For example, the first statistical weight may be a within-element statistical weight that reflects the importance of the element itself. The second statistical weight may be an across-element statistical weight that reflects the importance of the element relative to other elements.

A complexity value may be determined for each element associated with the one or more quantities. A quantity that is associated with an element may be associated with a complexity group that descriptively associates a group of quantities with a level of complexity. The complexity group may be low, medium, or high. The value of the first-statistical weight may be applied based on the complexity group that is associated with the quantity associated with the element.

An element may be associated with one or more of site complexity, mainframe operating system complexity, mainframe database complexity, mid-range computing complexity, network complexity, desktop computing complexity, operational process complexity, and dynamic environment complexity.

The number of people needed to operate one computing environment may be substantially different from the number of people needed to operate a different computing environment, even when the computing resources of the computing environment and the services provided by the computing environment are substantially similar. This may be particularly true when one computing environment provides computing resources and services to more than one customer or organization and the other computing environment provides computing resources and services to only one customer or organization. A computing environment that provides computing resources and services to more than one customer or organization may be referred to as an aggregated computing environment or a leveraged computing environment. A measure of the complexity of the computing environment may help account for the different amounts of human effort required to operate computing environments that have substantially similar computing resources and provide substantially similar services.

The ability to determine the complexity of a computing environment may be useful. For example, an estimate of the number of people needed to operate a particular computing environment may be obtained by using an indication of the complexity of the computing environment. While two computing environments operated at different facilities may have similar computing resources, provide similar services, and have similar complexity scores, one computing environment may be operated with fewer people to perform the same or similar work. Procedures or practices from the more-efficient facility may be identified and replicated in the less-efficient facility to help reduce the number of people needed to operate the less-efficient facility.

Implementations of the techniques discussed above may include a method or process, a system or apparatus, or computer software on a computer-accessible medium.

The details of one or more of the implementations are set forth in the accompanying drawings and description below. Other features will be apparent from the description and drawings, and from the claims.

DESCRIPTION OF THE DRAWINGS

FIGS. 2 and 12 are block diagrams illustrating results of determining the complexity of a computing environment.

Like reference symbols in the various drawings indicate like elements.

DETAILED DESCRIPTION

Techniques are described for determining the complexity of a computing environment. The techniques include developing a model for the complexity of a computing environment based on the quantity of particular elements of the computing environment. The model includes two statistical weights for each element in the complexity model. One statistical weight is applied to each element to provide a complexity rating of the element. Another statistical weight is applied to each element to provide a complexity rating across all elements. The complexity of a computing environment may be determined using the complexity ratings of the elements.

Figure 1:
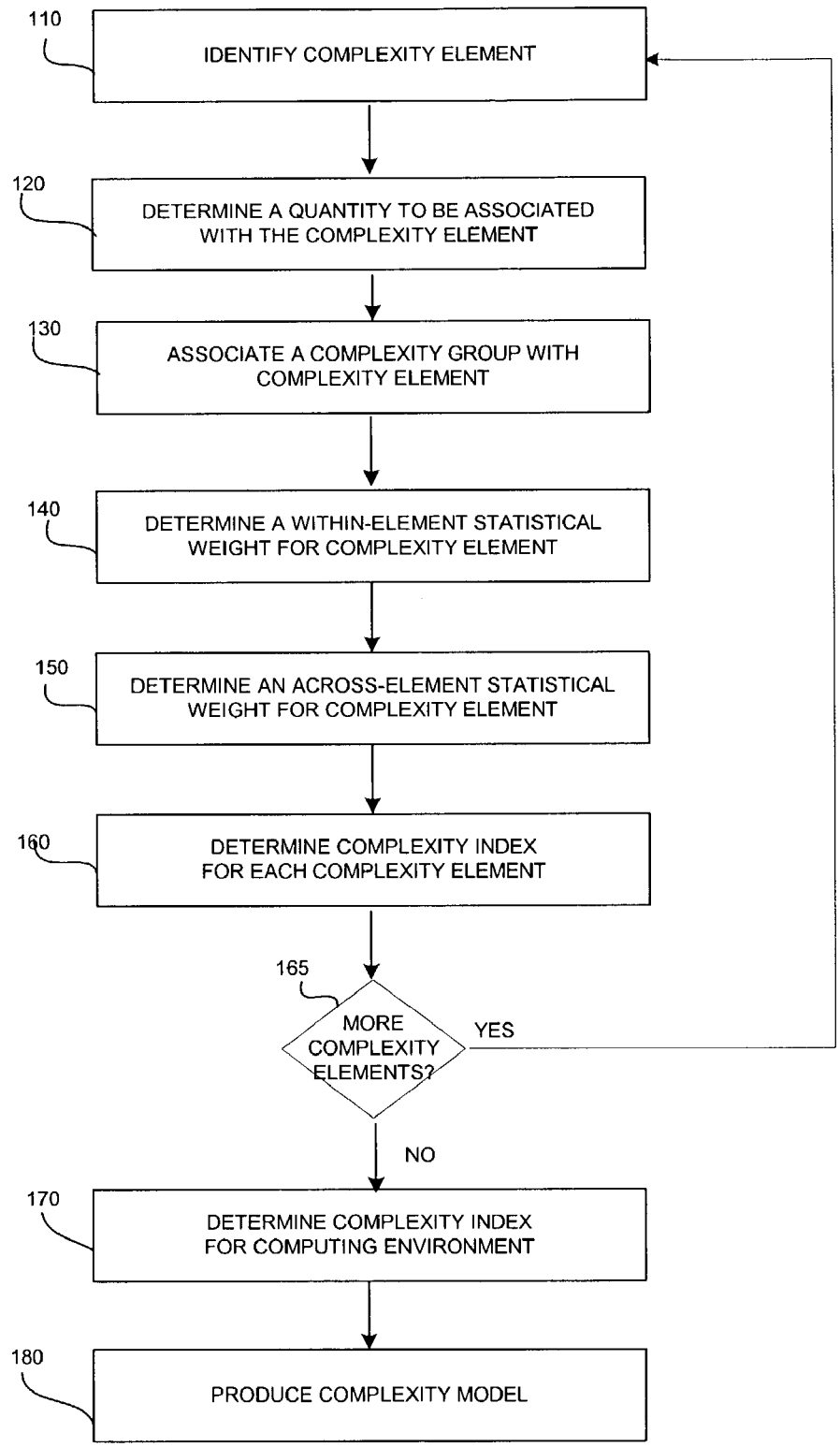
FIG. 1 is a flow chart of a process for determining the complexity of a computing environment.

FIG. 1 depicts a process 100 for determining the complexity of a computing environment. The process 100 may be performed by a person working alone or as part of a group. The person or group may be referred to as an analyst. An analyst may gather information using questionnaires, individual interviews, business process design sessions, planning sessions, or other types of workgroup sessions.

The process 100 begins with the identification of a complexity element (step 110). A complexity element refers to an aspect of the computing environment, such as a computing device, software used in the computing environment, an indicator of the degree of change, or an indicator of the types of processes used in operating computing environment. For example, a complexity element may be the number of protocols supported by a network in the computing environment.

The analyst determines a quantity to be associated with the identified complexity element (step 120). For example, when the complexity element is the number of protocols supported by a network in the computing environment, the quantity determined for that complexity element may be, for instance, two.

The analyst then associates a complexity group with the complexity element (step 130). The complexity group is a general indication of the degree of complexity associated with the complexity element based on the determined quantity. Examples of a complexity group include low, medium or high, with each complexity group (e.g., low, medium or high) being associated with a particular numerical range of the complexity elements. For example, the complexity element for the number of protocols supported by a network may be associated with low complexity when the number of protocols supported is one. The complexity element may be associated with medium complexity when the number of protocols supported is two or three. The complexity element may be supported with a high level of complexity when the number of protocols supported by the computing environment is more than three.

In some cases, however, a complexity group may be associated with a particular complexity element based on a description of an aspect of the computing environment. For example, when a computing environment is certified by the International Organization for Standardization (ISO) or has a management system in place that is otherwise certified, a complexity element related to the processes used by the computing environment may be associated with a low complexity group. When the computing environment has some level of standardized operating procedures in place, a complexity element related to the processes used may be associated with a medium complexity group. When the computing environment has no standardized operating procedures in place, a complexity element related to the processes used may be associated with a high complexity group.

An analyst determines a within-element statistical weight for the complexity element (step 140). A within-element statistical weight may be associated with each complexity group that may be associated with a complexity element. For example, a quantitative value may be associated with a low complexity group, a different statistical weight may be associated with a medium complexity group, and a different within-element statistical weight may be associated with a high complexity group.

A value of a within-element statistical weight may be associated with a particular complexity group for all complexity elements. For example, the same quantitative value may be associated with a low complexity group for all complexity elements and a different quantitative value may be associated with a high complexity group for all complexity elements. In contrast, in some implementations, different within-element statistical weights may be associated with the same complexity group for different complexity elements. For example, a quantitative value may be associated with a low complexity group for a particular complexity element and a different quantitative value may be associated with a low complexity group for a different complexity element.

The ability to associate a complexity group that reflects a general amount of complexity, such as by associating a complexity group with each complexity element, may be beneficial. For example, the complexity group may permit reduced precision in the quantity of a complexity element.

An analyst determines an across-element statistical weight for each complexity element (step 150). The across-element statistical weight allows for setting of the relative importance between different complexity elements or different groups of complexity elements. The across-element statistical weight may provide a complexity rating across all elements. For example, the same complexity element (e.g., the number of servers or the number of operating system instances) may be used both as a complexity element for describing mainframe computer complexity and for describing mid-range computer complexity in a computing environment. A mainframe computer complexity element that corresponds to the same complexity group (e.g., low, medium or high) as a mid-range computer complexity element, however, may reflect a less complex computer environment. For example, typical mainframe operating tasks may be associated with a higher degree of automation as compared with the degree of automation for typical mid-range operating tasks. An across-element statistical weight may account for such differences.

An analyst then determines a complexity index for each complexity element (step 160). A complexity index reflects a degree of complexity for a complexity element based on a within-element statistical weight and an across-element statistical weight of the complexity element. For example, a complexity index for each complexity element may be determined by multiplying the quantity of the complexity element by a within-element statistical weight and multiplying the result by an across-element statistical weight.

In some implementations, a more complicated complexity index may be determined. For example, the complexity index for a complexity element may be a normalized index that is based on an absolute index. An absolute index may be computed in which the within-element statistical weight is first multiplied by the quantity of a complexity element to produce a total statistical weighted complexity for the element. The total statistical weight then is divided by a maximum amount of complexity for the complexity element. The maximum amount of complexity may be determined by multiplying the within-element statistical weight for a high complexity group (regardless of the complexity group that is associated with the complexity element in step 130) by the determined quantity associated with the complexity element. The normalized complexity index may be computed by dividing the absolute index by an across-element statistical weight that is assigned to the complexity element in step 150.

In some implementations, an absolute complexity index for a complexity element may be determined by multiplying a portion of the quantity value by the appropriate complexity group value. For example, a complexity element may have a range of complexity groups that varies from low (one to five), medium (six to eleven), and high (more than eleven) and a computing environment may have a quantity of the complexity element of twelve. A within-element statistical weight associated with the low complexity group may be applied to a value equal to the maximum quantity associated with a low complexity group for the complexity element (here, five). A within-element statistical weight associated with the medium complexity group may be applied to the difference between the maximum quantity associated with a medium complexity group and the maximum quantity associated with the low complexity group (here, six (eleven minus five)). A within-element statistical weight associated with the high complexity group may be applied to the remaining quantity of the complexity element (here, one (twelve minus eleven)). The absolute complexity index is determined by summing the results from the separate applications of within-element statistical weights. This technique may provide a more accurate complexity index for a complexity element because each addition to a computing environment results in an increase of the complexity index for the complexity element and the computing environment.

In some implementations, a complexity index for a complexity element may be a derived index that is based, at least in part, on a second overall complexity value associated with a complexity element. The second overall complexity value may represent the relative importance of a complexity element relative to all complexity elements.

When more complexity elements are to be determined (step 165), an analyst identifies another complexity element (step 110) and proceeds as described previously.

When no more complexity elements are to be determined (step 165), an analyst determines the complexity index for the computing environment (step 170). The complexity index for the computing environment may be determined by the summation of the complexity index for each complexity element.

An analyst may produce the complexity model for the computing environment (step 180). For example, a printed version of the complexity model for the computing environment may be produced.

In some implementations, the process 100 may be performed by the collaboration of a complexity analyst and a subject matter expert familiar with one or more aspects of the computing environment. The complexity analyst, for example, may identify complexity elements to be used to measure the complexity of a computing environment (step 110). For each complexity element, the complexity analyst may associate a complexity group (step 130), a within-element statistical weight (step 140), and an across-element statistical weight (step 150). One or more subject matter experts may identify a quantity to be associated with each complexity element (step 120). For example, a manager of mainframe computers in the computing environment may identify a quantity to be associated with each complexity element related to a mainframe computer, and a manager of mid-range computers in the computing environment may identify a quantity to be associated with each complexity element related to a mid-range computer. The complexity analyst then may determine the complexity index for each complexity element and for the computing environment.

The process 100 may be implemented using a spreadsheet. For example, using a version of Excel available from Microsoft Corporation of Redmond, Wash., an electronic spreadsheet for a computing environment may be created. The electronic spreadsheet may include a row for each complexity element and a row for the complexity index for the computing environment. The electronic spreadsheet also may include a column for each of a quantity, a complexity group, a within-element statistical weight, an across-element statistical weight, and a complexity index associated with a complexity element. Other data management techniques also may be used to implement process 100.

FIG. 2 illustrates exemplary results 200 of determining the complexity of a computing environment, such as by using process 100. For brevity, only a few illustrative elements are included in the results 200.

The results 200 include complexity elements 210, 220, and 230, and a complexity index 240 for the computing environment. For each of complexity element 210, 220, or 230, a quantity 250, 251, or 252 (such as the quantity determined in step 110 in FIG. 1) may be presented. A complexity group 255, 256, or 257 (such as a complexity group associated with a complexity element in step 130 in FIG. 1) may be presented for each complexity element 210, 220, or 230. A within-element statistical weight 260, 261, or 262 (such as one determined in step 140 in FIG. 1) may be presented for each complexity element 210, 220, or 230. An across-element statistical weight 265, 266, or 267 (such as one determined in step 150 in FIG. 1) may be presented for each complexity element 210, 220, or 230. A maximum statistical weighted quantity 270, 271, or 272 may be presented for each complexity element 210, 220, or 230. The maximum statistical weighted quantity 270, 271, or 272 may be determined by multiplying the quantity 250, 251, or 252 by a maximum within-element statistical weight (here, 50), as described previously with respect to step 160 in FIG. 1.

The absolute complexity index 275, 276, or 277 for each complexity element 210, 220, or 230 may be determined by multiplying the quantity 250, 251, or 252 by the within-element statistical weight 260, 261, or 262 and dividing the multiplication result by the maximum statistical weighted quantity 270, 271, or 272.

The normalized complexity index 280, 281, or 282 for each complexity element 210, 220, or 230 may be determined by multiplying the absolute complexity index 275, 276, or 277 by the across-element statistical weight 265, 266, or 276.

The aggregated normalized complexity index 285 for the computing environment represents the complexity index for the computing environment. The aggregated normalized complexity index 285 may be determined by summing the normalized complexity indices 280, 281, and 282 for the complexity elements 210, 220, and 230.

Figure 3:
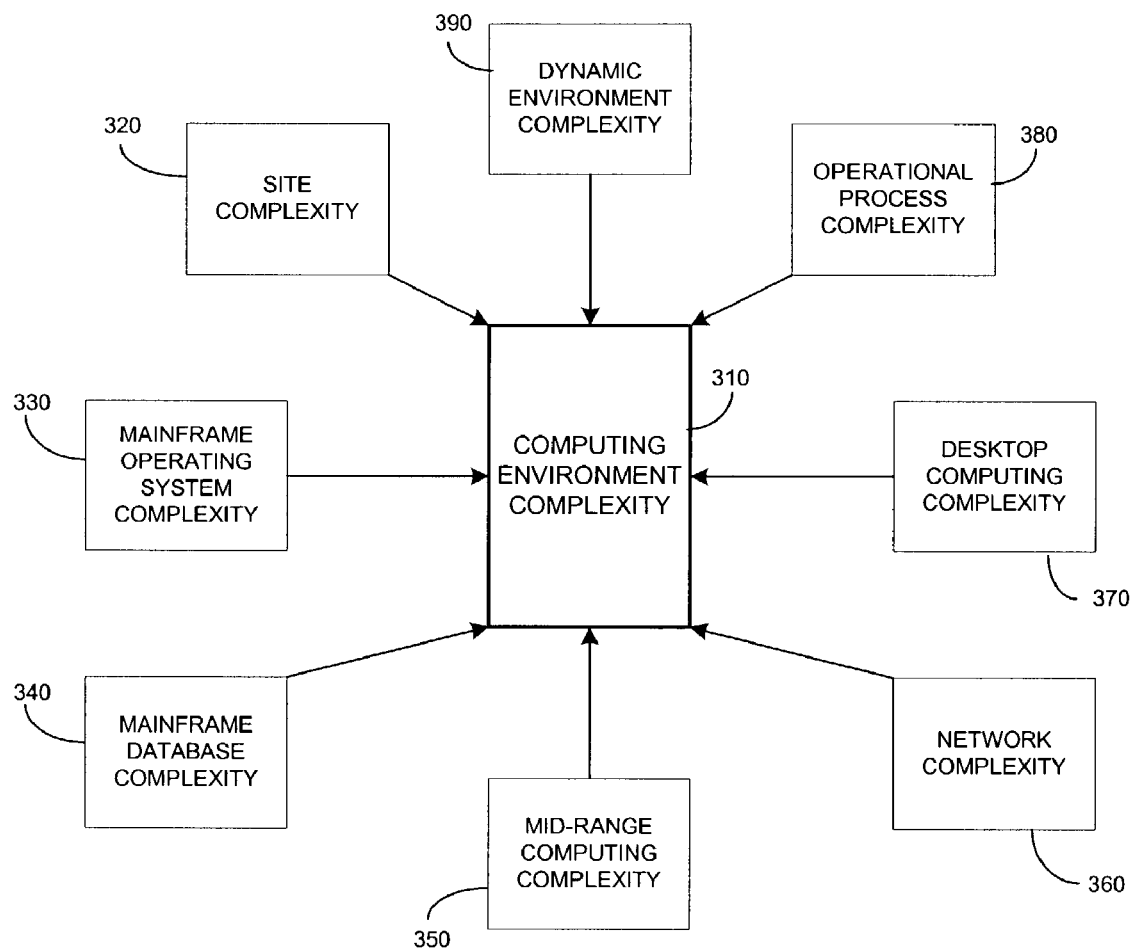
FIG. 3 is a flow chart for producing a model of the complexity of a computing environment.

For illustrative purposes, FIGS. 3–11 describe a particular implementation of a process to determine the complexity of a computing environment. The illustrated implementation is an aggregated computing environment that provides computing resources and services to more than one customer. Complexity elements are grouped into one of several complexity element types. A complexity element type may be referred to as a complexity category. FIG. 3 shows the complexity element categories that are used to organize complexity elements of the computing environment. FIGS. 4–11 illustrate examples of complexity elements for a particular complexity element category. The complexity elements described with respect to FIGS. 3–11 are illustrative. Some implementations may use other complexity elements, other complexity categories, or other complexity groups.

FIG. 3 illustrates various complexity categories that organize collections of complexity elements and may be used to determine the complexity of a computing environment. The complexity of a computing environment 310 include complexity elements that are related to a site complexity category 320, a mainframe operating system complexity category 330, a mainframe database complexity category 340, a mid-range computing complexity category 350, a network complexity category 360, a desktop computing complexity category 370, an operational process complexity category 380, and a dynamic environment complexity category 390.

The site complexity category 320 includes complexity elements that are related to the number and characteristics of the one or more sites, locations, or facilities that make-up the computing environment.

The mainframe operating system complexity category 330 includes complexity elements that are related to the operating characteristics of the one or more mainframe computers and one or more associated operating systems on the mainframe computers. The mainframe operating system complexity elements may be the same regardless of which operating system is being analyzed. In some implementations, the complexity elements may be different based on the type of mainframe operating system being described. In some implementations, each type of operating system for the mainframe computing environment may be described in a separate instance of a mainframe operating system complexity element.

The mainframe database complexity category 340 includes complexity elements that are related to the one or more data management systems, such as a DB2 data management system, an IMS data management system, a CICS (Customer Information Control System) data management system, or an Adabase data management system. DB2, IMS and CICS are data management systems by IBM Corporation of White Plains, N.Y. Adabase is a data management system by Software AG of Darmstadt, Germany. In some implementations, each type of database used in a computing environment may be described in a separate instance of a mainframe database complexity element.

The mid-range computing complexity category 350 includes complexity elements that relate to the operating system and database characteristics of one or more mid-range computers operated in the computing environment. In some implementations, the mid-range computer characteristics associated with the mid-range hardware and operating system may be separated from the mid-range computer database characteristics. Combining the hardware, operating system and database characteristics for a mid-range computer complexity category may provide a benefit. For example, a single individual or group may operate the hardware, operating system, and database for the mid-range computer and so be able to provide the quantitative information for all or most of the associated complexity elements.

The network complexity category 360 includes complexity elements related to operating the one or more networks of the computing environment.

The desktop computing complexity category 370 includes complexity elements related to operating a distributed desktop computing environment. The distributed desktop computing environment may include workstations, desktops, laptops, and other computing devices located outside of the computing facility.

The operational process complexity category 380 includes complexity elements related to the characteristics of the process environment of the computing environment.

The dynamic environment complexity category 390 includes complexity elements related to the changes in the environment and the speed at which the computing environment is growing.

Figure 4:
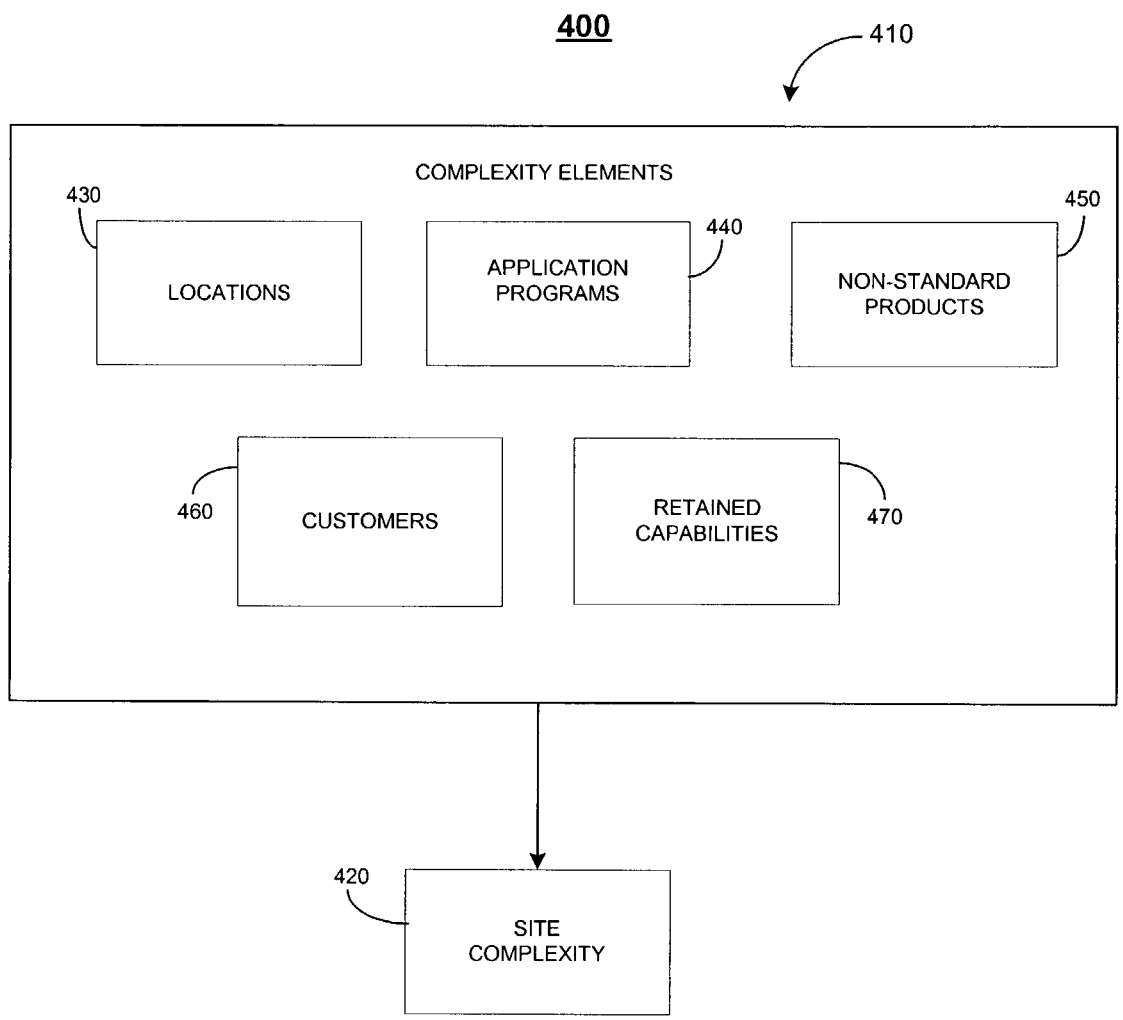
FIGS. 4–11 are flow charts for producing a complexity model of an aspect of a computing environment.

FIG. 4 shows example complexity elements 410 that may be included in a determination of site complexity 420. Complexity elements 410 include a locations complexity element 430, an application programs complexity element 440, a non-standard products complexity element 450, a customers complexity element 460, and a retained capabilities complexity element 470.

The locations complexity element 430 describes the number of locations that are supported by the computing environment. When the number of locations is less than ten, a complexity group of low is associated with the locations complexity element 430. When the number of locations is at least ten and less than twenty, a complexity group of medium is associated with the locations complexity element 430. When the number of locations is at least twenty, a complexity group of high is associated with the locations complexity element 430.

The application programs complexity element 440 describes the percentage of application programs that transmit data to one or more application programs that use a different operating system than the operating system used by the transmitting application program. When the percentage is less than ten percent, a complexity group of low is associated with the application programs complexity element 440. When the percentage is at least ten percent and less than twenty-five percent, a complexity group of medium is associated with the application programs complexity element 440. When the percentage of application programs is at least twenty-five percent, a complexity group of high is associated with the application programs complexity element 440.

In some implementations, the application programs complexity element 440 may be based on a percentage of applications that transmit data to a predetermined number of different operating systems and/or to a predetermined number of different computing platforms. For example, when less than ten percent of the application programs involve the transmission of data to three or more computing platforms, the application programs complexity element 440 may be associated with a complexity group of low. When at least twenty-five percent of the application programs involve the transmission of data to three or more computing platforms, the application programs complexity element 440 may be associated with a complexity group of high.

The non-standard products complexity element 450 describes the percentage of computing environment products that are not included in a list of standard product offerings in the computing environment or otherwise not supported by the organization responsible for operating the computing environment. When the percentage of non-standard products is less than five percent, a complexity group of low is associated with the non-standard products complexity element 450. When the percentage of non-standard products is at least five percent and less than fifteen percent, a complexity group of medium is associated with the non-standard products complexity element 450. When the percentage of non-standard products is at least fifteen percent, a complexity group of high is associated with the non-standard products complexity element 450.

The customers complexity element 460 describes the number of customers receiving information technology services from the computing environment. When the number of customers is less than five, a complexity group of low is associated with the customers complexity element 460. When the number of customers is from five to fifty, a complexity group of medium is associated with the customers complexity element 460. When the number of customers is more than fifty-one, a complexity group of high is associated with the customers complexity element 460.

A retained capabilities complexity element 470 may be included as a measure of site complexity 420. The retained capabilities complexity element 470 describes the amount of the computing environment over which the customer has retained control. For example, a customer may retain control of the database administration responsibilities associated with a particular enterprise application system. When the percentage of information technology capabilities is less than five percent of the computing environment, a complexity group of low is associated with the retained capabilities complexity element 470. When the percentage of information technology capabilities is at least five percent and less than fifteen percent of the computing environment, a complexity group of medium is associated with the retained capabilities complexity element 470. When the percentage of information technology capabilities is more than fifteen percent of the computing environment, a complexity group of high is associated with the retained capabilities complexity element 470.

In some implementations, the application programs complexity element 440 and the customers complexity element 460 may be associated with a higher across-element statistical weight than the other complexity elements 430, 450, and 470.

Figure 5:
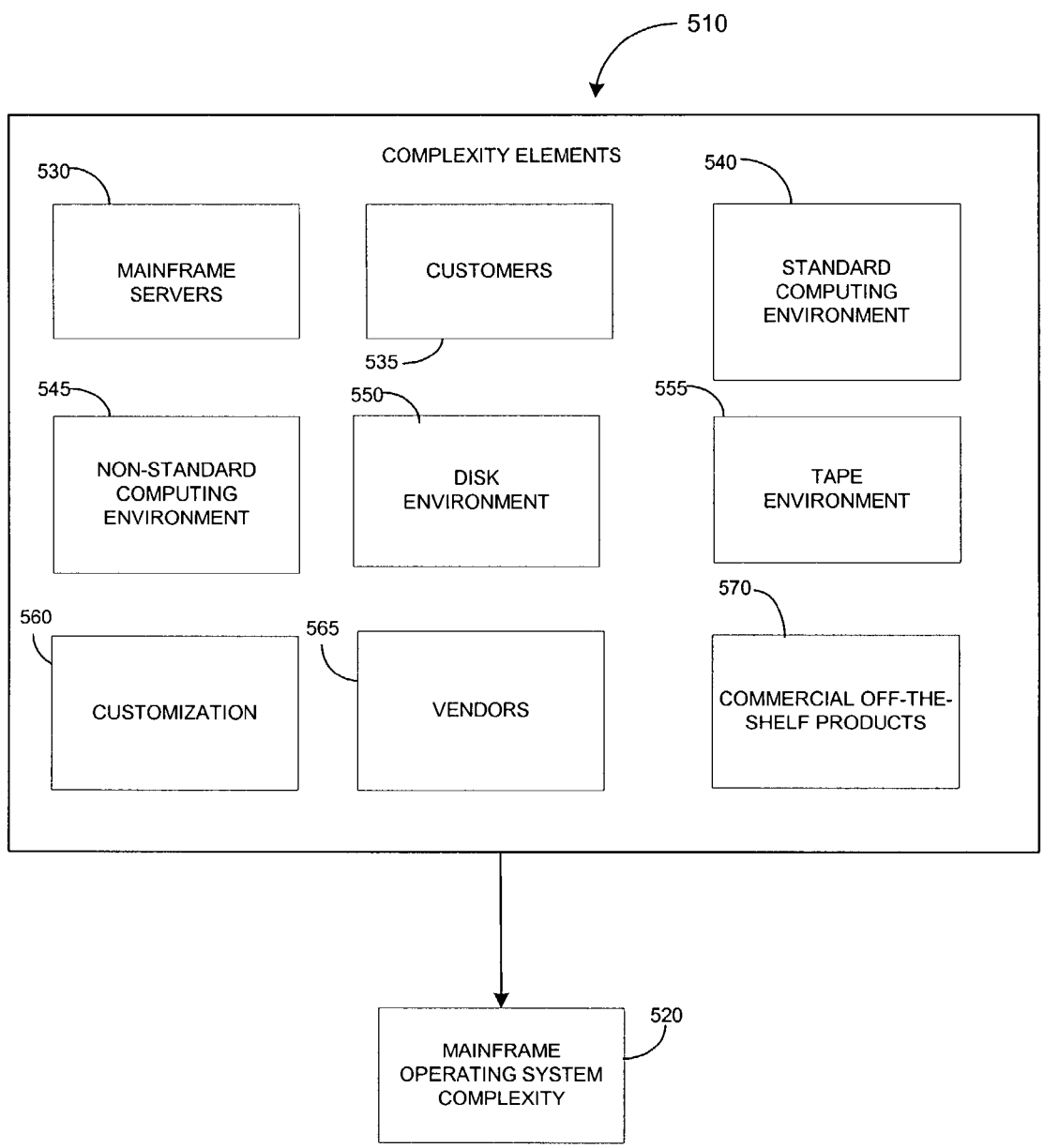

FIG. 5 shows example complexity elements 510 that may be included in the determination of mainframe operating system complexity 520. Complexity elements 510 include a mainframe servers complexity element 530, a customers complexity element 535, a standard computing environment complexity element 540, a non-standard computing environment complexity element 545, a disk environment complexity element 550, a tape environment complexity element 555, a customization complexity element 560, a vendors complexity element 565, and a commercial off-the-shelf products complexity element 570.

The mainframe servers complexity element 530 describes the number and characteristics of the mainframe servers used in the computing environment. When the number of mainframe servers is one, a complexity group of low is associated with the mainframe servers complexity element 530. When the number of mainframe servers is more than one and the servers are clustered in a non-shared environment with a shared job entry system (or an otherwise multiplexed environment), a complexity group of medium is associated with the mainframe servers complexity element 530. When the number of mainframe servers is more than one and the mainframe servers are clustered in a shared data environment, a complexity group of high is associated with the mainframe servers complexity element 530.

The customers complexity element 535 describes the number of customers that are provided computing resources or services by the mainframe computing environment. When the mainframe computing environment provides computing resources or services to a single customer, a complexity group of low is associated with the customers complexity element 535. When the mainframe computing environment provides computing resources or services to more than one customer and less than ten customers, a complexity group of medium is associated with the customers complexity element 535. When the mainframe computing environment provides computing resources or services to ten or more customers, a complexity group of high is associated with the customers complexity element 535.

The standard computing environment complexity element 540 describes the number of mainframe operating system products, resources or services provided by the computing environment that are standard products, resources or services. A standard product, resource, or service is one that is included as part of a regular offering by the organization and not provided specifically at the request of one customer. When the number of standard mainframe operating system products, resources, or services is less than 1,000, a complexity group of low is associated with the standard computing environment complexity element 540. When the number of standard mainframe operating system products, resources, or services is from 1,000 to less than 5,000, a complexity group of medium is associated with the standard computing environment complexity element 540. When the number of standard mainframe operating system products, resources, or services is 5,000 or more, a complexity group of high is associated with the standard computing environment complexity element 540.

The non-standard computing environment complexity element 545 describes the degree of support required for non-standard resources, products, and services provided by the computing environment. When non-standard resources, products, and services require less than 100 hours per month, a complexity group of low is associated with the non-standard computing environment complexity element 545. When non-standard resources, products, and services require 100 or more hours per month and less than 500 hours per month, a complexity group of medium is associated with the non-standard computing environment complexity element 545. When non-standard products require 500 or more hours per month, a complexity group of high is associated with the non-standard computing environment complexity element 545.

The disk environment complexity element 550 describes the type of support for disk storage. When the disk storage environment includes a disk storage that is used only by a particular mainframe server (e.g., the disk storage is dedicated) and the disk storage is fully, or nearly fully, automated, a complexity group of low is associated with the disk environment complexity element 550. When the disk storage includes disk storage that is shared among more than one mainframe server (e.g., a shared disk storage array) and includes minimal automation, a complexity group of medium is associated with the automation support for the disk environment complexity element 550. When the disk storage may be characterized as a storage area network (SAN) environment and no automation is associated with the disk storage environment, a complexity group of high is associated with the disk environment complexity element 555.

The tape environment complexity element 555 describes the level of support for the tape environment for the mainframe computing environment. When the mainframe environment may be characterized as dedicated tape units with manual intervention, a complexity group of low is associated with automation support for the tape environment complexity element 555. When the tape environment for the mainframe may be characterized as shared tape units with minimal manual intervention, a complexity group of medium is associated with the tape environment complexity element 555. When the mainframe tape environment may be characterized as distinct or separated environment (e.g., a silo) that does not require manual intervention other than manual intervention to send the produced tapes externally to a destination, a complexity group of high is associated with the tape environment complexity element 555.

The customization complexity element 560 describes the degree of customization or user modifications that are made to support the mainframe computing environment. When the degree of customization is less than 20 user modifications and all user modifications are simple, a complexity group of low is associated with the customization complexity element 560. When the number of customizations or user modifications is 20 to 50 user modifications and/or one or two user modifications are complex, a complexity group of medium is associated with the customization complexity element 560. When the number of user modifications is more than 50 and/or more than two user modifications are relatively complex, a complexity group of high is associated with the customization complexity element 560.

The vendors complexity element 565 describes the number of different vendors that are used to support the mainframe operating system environment. When the number of different vendors is less than 50, a complexity group of low is associated with the vendors complexity element 565. When the number of vendors is at least 50 and less than 150, a complexity group of medium is associated with the vendors complexity element 565. When the number of different vendors is at least 150, a complexity group of high is associated with the vendors complexity element 565.

The commercial off-the-shelf products complexity element 570 describes the percentage of commercially off-the-shelf (COTS) products in the mainframe operating system environment. When the percentage of COTS products is at least 95 percent of all installed products, a complexity group of low is associated with the commercial off-the-shelf products complexity element 570. When the percentage of COTS products is more than 50 percent and less than 95 percent, a complexity group of medium is associated with the commercial off-the-shelf products complexity element 570. When the percentage of COTS products is 50 percent or less, a complexity group of high is associated with the commercial off-the-shelf products complexity element 570.

In some implementations, the customers complexity element 535 may be associated with the highest across-element statistical weight in the mainframe operating system complexity element. The mainframe servers complexity element 530, the standard computing environment complexity element 540, the non-standard computing environment complexity element 545, and the customization complexity element 560 may be associated with a higher across-element statistical weight than the across-element statistical weight associated with the disk environment complexity element 550 and the tape environment complexity element 555.

Figure 6:
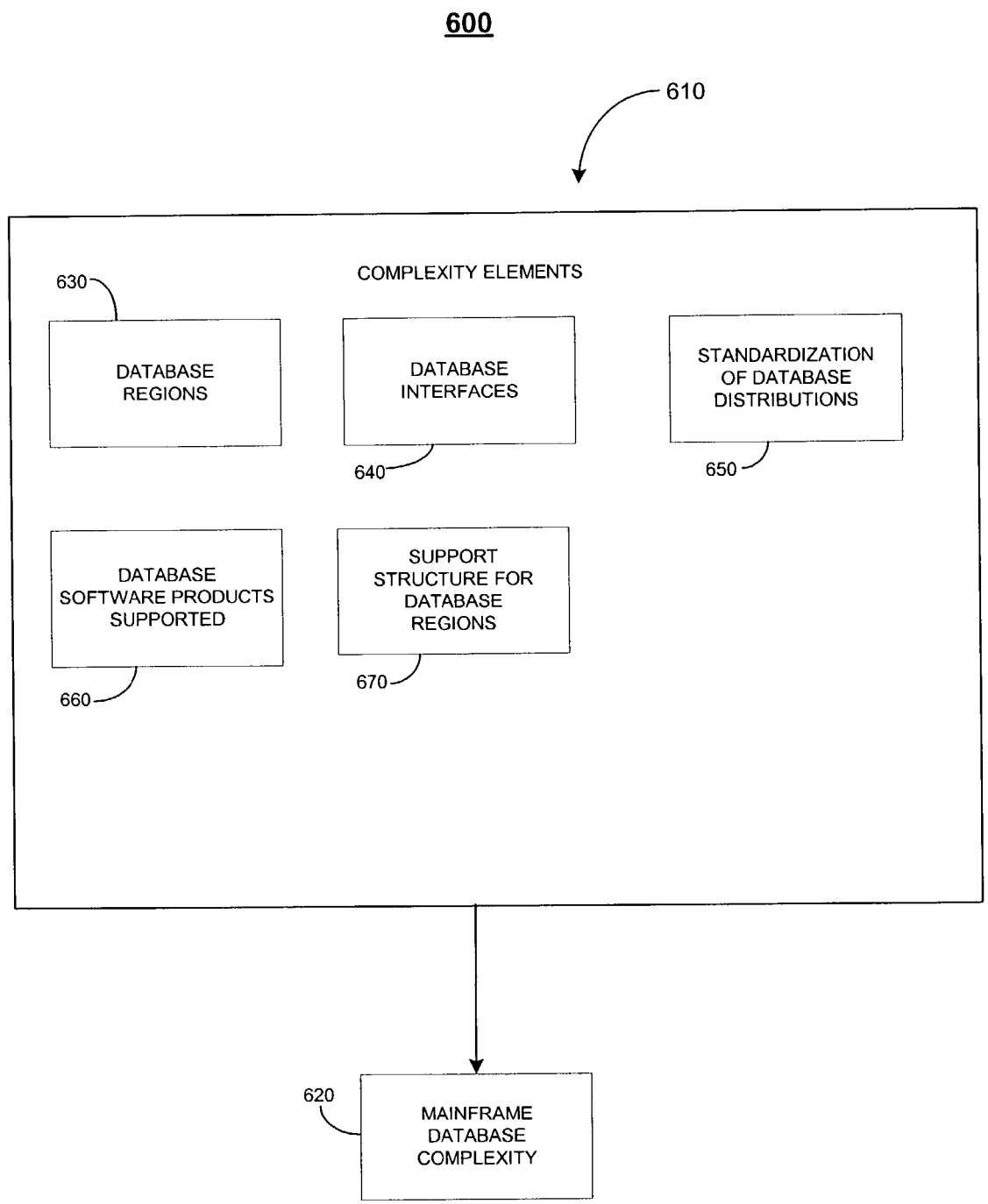

FIG. 6 shows examples of complexity elements 610 that may be included in a determination of mainframe database complexity 620. The mainframe database complexity 620 describes the complexity of the mainframe database environment. Complexity elements 610 include a database regions complexity element 630, a database interfaces complexity element 640, a standardization of database distributions complexity element 650, a database software products supported complexity element 660, and a support structure for database regions complexity element 670.

The database regions complexity element 630 describes the number of database regions in the mainframe computing environment that meet predetermined characteristics. The number of database regions that can be characterized as basic regions or clones of other regions is associated with a complexity group of low for the database regions complexity element 630. The number of database regions that are multi-client regions and/or may be characterized as complex regions is associated with a complexity group of medium for the database regions complexity element 630. The number of database regions that include parallel processing is associated with a complexity group of high for the database regions complexity element 630. An analyst may determine the number and characteristics of database regions for the mainframe operating system and enter a quantity in the appropriate complexity group that corresponds to the characteristics of the database regions. For example, an analyst may determine that ten database regions are basic regions and associate a quantity of ten with a low complexity group. The analyst also may determine that the mainframe computing environment has 62 database regions that are multi-client regions and associate the quantity 62 with the complexity group of medium for the database regions complexity element 630.

The database interfaces complexity element 640 describes the number of supported interfaces into database regions. When the number of supported interfaces is less than 50, a complexity group of low is associated with the database interfaces complexity element 640. When the number of interfaces into the database regions is at least 50 and less than 100, a complexity group of medium is associated with the database interfaces complexity element 640. When the number of supported interfaces into the database regions is at least 100, a complexity group of high is associated with the database interfaces complexity element 640.

The standardization of database distributions complexity element 650 describes the degree of standardization for a database operating on the mainframe computing environment. When the database distributions can be described as standard with no modifications, a complexity group of low is associated with the standardization of database distributions complexity element 650. When the degree of standardization of the database can be characterized as standard with minor modifications, a complexity group of medium is associated with the standardization of database distributions complexity element 650. When the degree of standardization can be described as non-standard, a complexity group of high is associated with the standardization of database distributions complexity element 650.

The database software products supported complexity element 660 describes the number of database regions with a dedicated support structure and the number of database regions with an aggregated support structure. A database region with a dedicated support structure describes a database region that provides database services to only one customer. A database region with an aggregated support structure describes a database region that provides database services to more than one customer. The number of database regions with dedicated support structure is associated with a low complexity group. The number of database regions with an aggregated support structure is associated with a high complexity group.

Figure 7:
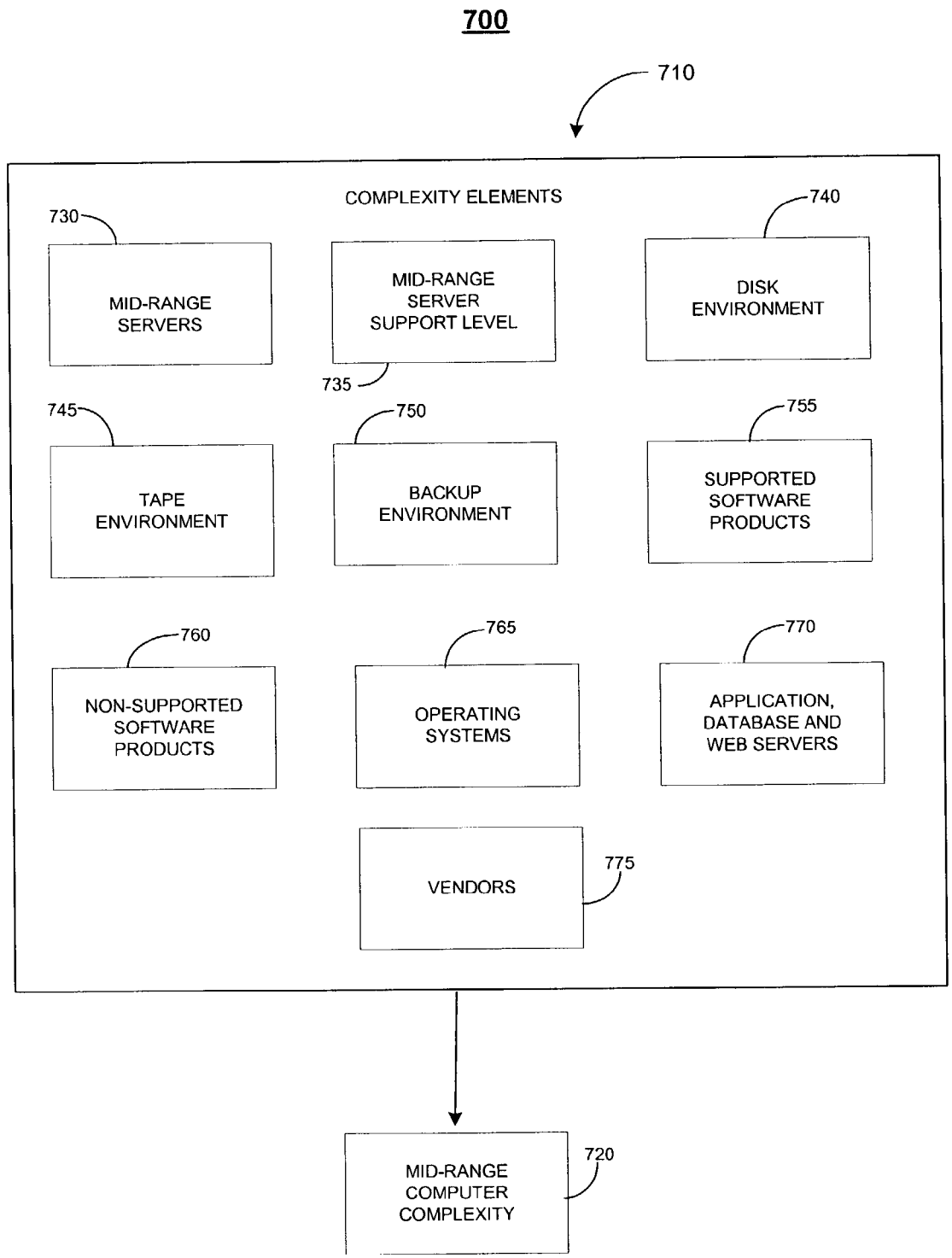

FIG. 7 shows examples of complexity elements 710 that may be included in the determination of mid-range computer complexity 720. The mid-range computer complexity 720 describes the hardware, operating system, and database environment complexity for mid-range computers. Complexity elements 710 include a mid-range servers complexity element 730, a mid-range server support level complexity element 735, a disk environment complexity element 740, a tape environment complexity element 745, a backup environment complexity element 750, a supported software products complexity element 755, a non-supported software products complexity element 760, an operating systems complexity element 765, an application, database, and web servers complexity element 770, and a vendors complexity element 775.

The mid-range servers complexity element 730 describes the number and characteristics of mid-range servers in the computing environment. The number of single server mid-range computing environments is associated with a complexity group of low. The number of mid-range servers that can be characterized as clustered or having a non-shared data environment is associated with a complexity group of medium. The number of mid-range servers that can be characterized as clustered with a shared data environment is associated with a complexity group of high. For example, an analyst may determine that a particular computing environment has 893 single server mid-range servers and associate the quantity 893 with a low complexity group for the mid-range servers complexity element 730. The analyst also may determine that the computing environment has 396 mid-range servers that are associated with a clustered and non-shared data environment and associate the quantity 396 with a medium complexity group for the mid-range servers complexity element 730. Finally, the analyst may determine that 308 mid-range servers are associated with a clustered and shared data environment and associate the quantity 308 with a high complexity group for the mid-range servers complexity element 730.

The mid-range server support level complexity element 735 describes the number and characteristics of mid-range servers. A complexity group of low is associated with the number of mid-range servers that are supported with only a basic level of services, such as support services for only eight hours a day for five days per week. A complexity group of medium is associated with mid-range computers that are associated with a mid-level of support services, such as support services for twelve hours a day for five days a week. The complexity group of high is associated with the number of mid-range servers that are supported with the high level of support services, such as twenty-four hour support for seven days a week. For example, an analyst may determine that a computing environment has 562 mid-range servers that are required to be provided with a basic level of support, 512 mid-range servers that are required to be provided with a mid-level of support, and 141 mid-range computing servers that are required to be provided with a high level of support. The analyst associates the quantity 562 with a complexity group of low, the quantity 512 with a complexity group of medium, and the quantity 141 with a complexity group of high for the mid-range server support level complexity element 735.

The disk environment complexity element 740 has been described previously with respect to complexity element 550 of FIG. 5. The tape environment complexity element 745 has been described previously with respect to complexity element 555 of FIG. 5.

The backup environment complexity element 750 describes the number of servers with various backup environment characteristics. For example, the number of servers without a backup environment may be associated with a complexity group of low, the number of servers that are associated with a centralized backup environment may be associated with a complexity group of medium, and the number of servers that are associated with a non-centralized backup environment may be associated with a complexity group of high. For example, an analyst may determine that the number of servers without a backup environment is 107, the number of mid-range computing servers that are associated with the centralized backup environment is 1,017, and the number of servers associated with a non-centralized backup environment is 471. The analyst then associates the quantity 107 with a complexity group of low, the quantity 1,017 with a complexity group of medium, and the quantity 471 with a complexity group of high for the backup environment complexity element 750.

The supported software products complexity element 755 describes the number of supported software products in the mid-range computing environment. When the number of supported software products is less than 100, a complexity group of low is associated with the supported software products complexity element 755. When the number of supported software products is at least 100 and less than 1,500, a complexity group of medium is associated with the supported software products complexity element 755. When the number of supported software products is at least 1,500, a complexity group of high is associated with the supported software products complexity element 755.

The non-supported software products complexity element 760 describes the number of supported software products in the mid-range computing environment that are not supported by the organization responsible for operating the computing environment. When the number of non-supported software products is less than 100, a complexity group of low is associated with the non-supported software products complexity element 760. When the number of non-supported software products is at least 100 and less than 150, a complexity group of medium is associated with the non-supported software products complexity element 760. When the number of non-supported software products is at least 150, a complexity group of high is associated with the non-supported software products complexity element 760.

The operating systems complexity element 765 describes the number of different operating systems that operate in the mid-range computing environment. When the number of different operating systems is less than fifteen, a complexity group of low is associated with the operating systems complexity element 765. When the number of operating systems is at least fifteen and less than thirty, a complexity group of medium is associated with the operating systems complexity element 765. When the number of operating systems is at least thirty, a complexity group of high is associated with the operating systems complexity element 765.

The application, database, and web servers complexity element 770 describes the application, database, and web servers in the computing environment. A complexity group of low is associated with a number corresponding to the number of stand-alone application, database, or web servers. A complexity group of medium is associated with the number of inter-connected servers that do not have a web server interface. A complexity group of high is associated with the number corresponding to the number of inter-connected servers that have a web server interface. For example, an analyst may determine that a mid-range computing environment includes 272 stand-alone application, database, or web servers, that there are 707 application, database, or web servers that are interconnected and do not have a web server interface, and that 437 application, database, and web servers are interconnected servers that include web server interfaces. The analyst may associate the appropriate quantity of servers with each complexity group for the complexity element 770. Here, the analyst would associate 272 with the low complexity group, 707 with the medium complexity group, and 437 with the high complexity group for the application, database, and web servers complexity element 770.

The vendors complexity element 775 describes the number of vendors that are involved in the computing environment for mid-range computers. When the number of different vendors is less than 50, a complexity group of low is associated with the vendors complexity element 775. When the number of vendors is at least 50 and less than 150, a complexity group of medium is associated with the vendors complexity element 775. When the number of vendors is at least 150, a complexity group of high is associated with the vendors complexity element 775.

In some implementations, the mid-range server complexity element 730 may be associated with the highest across-element statistical weight. The mid-ranger server support level complexity element 735, the disk environment complexity element 740, and the application, database, and web servers complexity element 770 may be associated with a higher across-element statistical weight than the across-element statistical weight associated with the tape environment complexity element 745, the backup environment complexity element 750, the supported software products complexity element 755, the non-supported software products complexity element 760, the operating systems complexity element 765, or the vendors complexity element 775.

Figure 8:
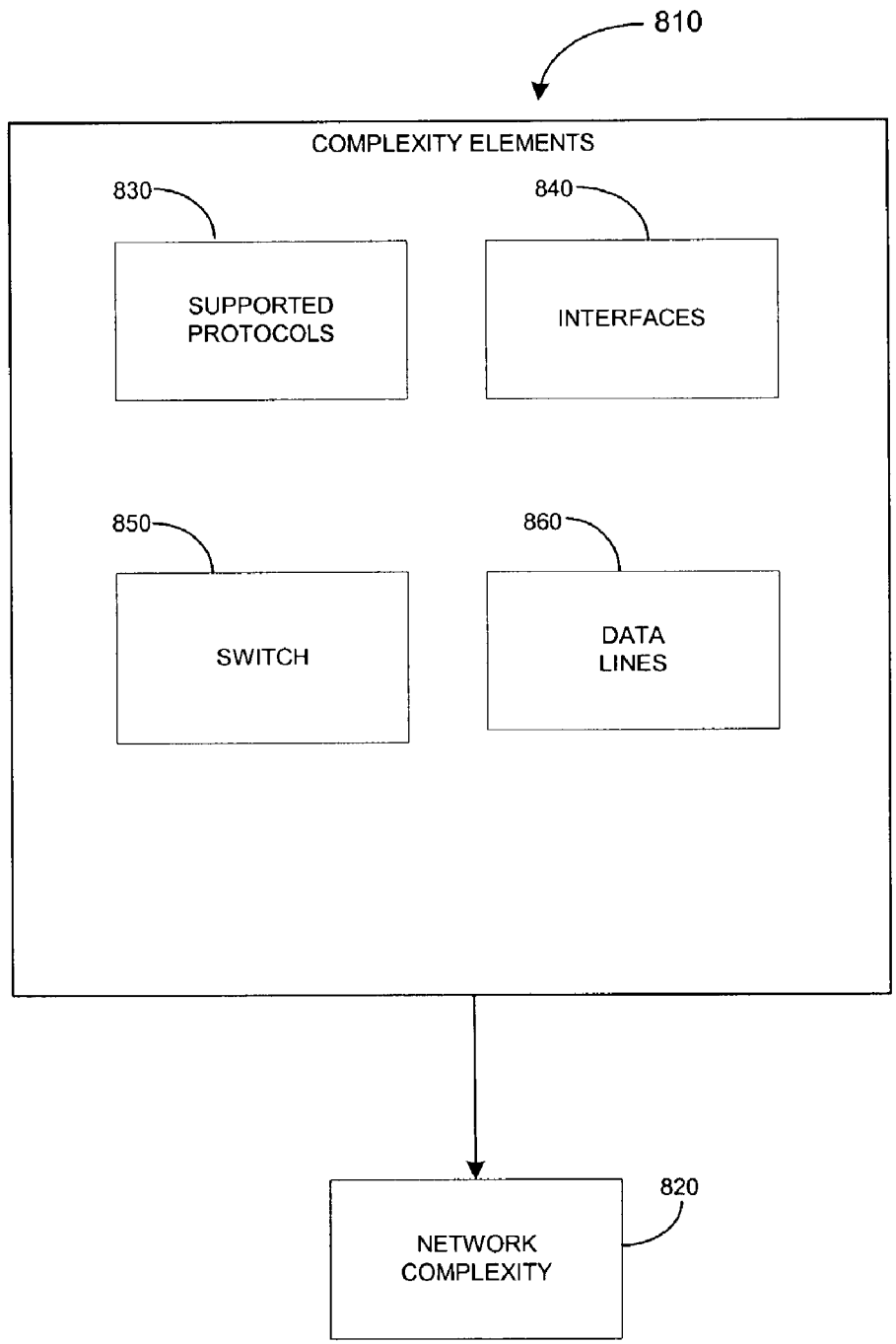

FIG. 8 shows example complexity elements 810 that may be included in a determination of network complexity 820. Network complexity 820 describes the complexity of the network provided by the computing environment. Complexity elements 810 include a supported protocols complexity element 830, an interfaces complexity element 840, a switch complexity element 850, and a data lines complexity element 860.

The supported protocols complexity element 830 describes the number of supported protocols in the computing environment. When only one network protocol is supported, a complexity group of low is associated with the supported protocols complexity element 830. When the number of protocols supported is two, a complexity group of medium is associated with the supported protocols complexity element 830. When the number of protocols supported is three or more, a complexity group of high is associated with the supported protocols complexity element 830.

The interfaces complexity element 840 describes the number of interfaces to external networks. When only one external interface is supported, a complexity group of low is associated with the interfaces complexity element 840. When the number of interfaces to external networks is at least two and not more than ten, a complexity group of medium is associated with the interfaces complexity element 840. When the number of interfaces to external networks is more than ten, a complexity group of high is associated with the interfaces complexity element 840.

The switch complexity element 850 describes the number and/or characteristics of switches included in the computing environment network. For example, when the switches in the network include less than 100 ports, a complexity group of low is associated with the switch complexity element 850. When the switches include from 100 to 500 ports, a complexity group of medium is associated with the switch complexity element 850. When the switches include more than 500 ports, a complexity group of high is associated with the switch complexity element 850.

The data lines complexity element 860 describes the number of logical lines supported. When the number of logical lines is less than 1,000, a complexity group of low is associated with data lines complexity element 860. When the number of logical lines supported is from 1,000 to 5,000, a complexity group of medium is associated with the data lines complexity element 860. When the number of logical lines supported is greater than 5,000, a complexity group of high is associated with the data lines complexity element 860. In some implementations, the data lines complexity element 860 may include the number of physical lines supported.

Figure 9:
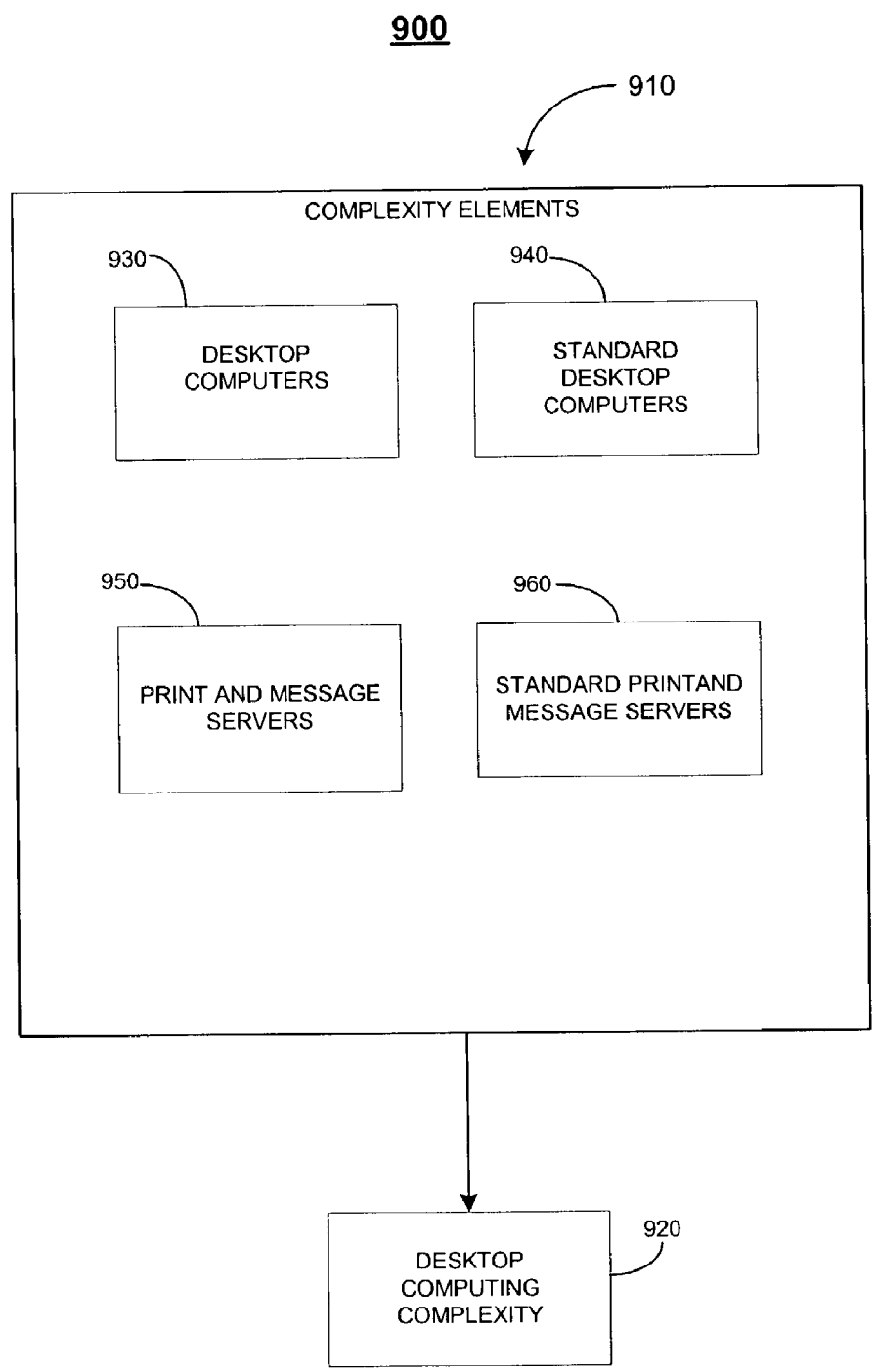

FIG. 9 shows example complexity elements 910 that may be included in a determination of desktop computing complexity 920. Complexity elements 910 include a desktop computers complexity element 930, a standard desktop computers complexity element 940, a print and message servers complexity element 950, and a standard print and message servers complexity element 960.

The desktop computers complexity element 930 describes the number of desktop computers supported. A desktop computer may refer to a personal computer, a workstation, a laptop, or another type of a computing device. Typically, a desktop computer is located outside of the computing environment facility in which the mid-range computers or mainframe computers are located. When the number of desktop computers supported is less than 10,000, a complexity group of low is associated with the desktop computers complexity element 930. When the number of desktops supported is from 10,000 to 50,000 desktop computers, a complexity group of medium is associated with the desktop computers complexity element 930. When the number of desktops supported is more than 50,000, a complexity group of high is associated with the desktop computers complexity element 930.

The standard desktop computers complexity element 940 describes the percentage of desktop computers that have a standard configuration of components and characteristics and/or operate a set of standard software. When the percentage of desktop computers is 100 percent, a complexity group of low is associated with the standard desktop computers complexity element 940. When the percentage of standard desktop computers is less than 100 percent but more than 80 percent, a complexity group of medium is associated with the standard desktop computers complexity element 940. When the percentage of standard desktop computers is 80 percent or less, a complexity group of high is associated with the standard desktop computing complexity element 940.

The print and message servers complexity element 950 describes the number of print and message servers supported. When the number of print and message servers supported is less than 200, a complexity group of low is associated with the print and message servers complexity element 950. When the number of print and message servers supported is between 200 and 1,000, a complexity group of medium is associated with the print and message servers complexity element 950. When the number of print and message servers supported is more than 1,000, a complexity group of high is associated with the print and message servers complexity element 950.

The standard print and message servers complexity element 960 describes the degree to which the print and message servers are based on standard configurations of components and/or software. When the percentage of print and message servers that have standard configurations is 100 percent, a complexity group of low is associated with the standard print and message servers complexity element 960. When the percentage of print and message servers that have standard configurations is less than 100 percent and more than 80 percent, a complexity group of medium is associated with the standard print and message servers complexity element 960. When the percentage of print and message servers that have standard configurations is 80 percent or less, a complexity group of high is associated with the standard print and message servers complexity element 960.

Figure 10:
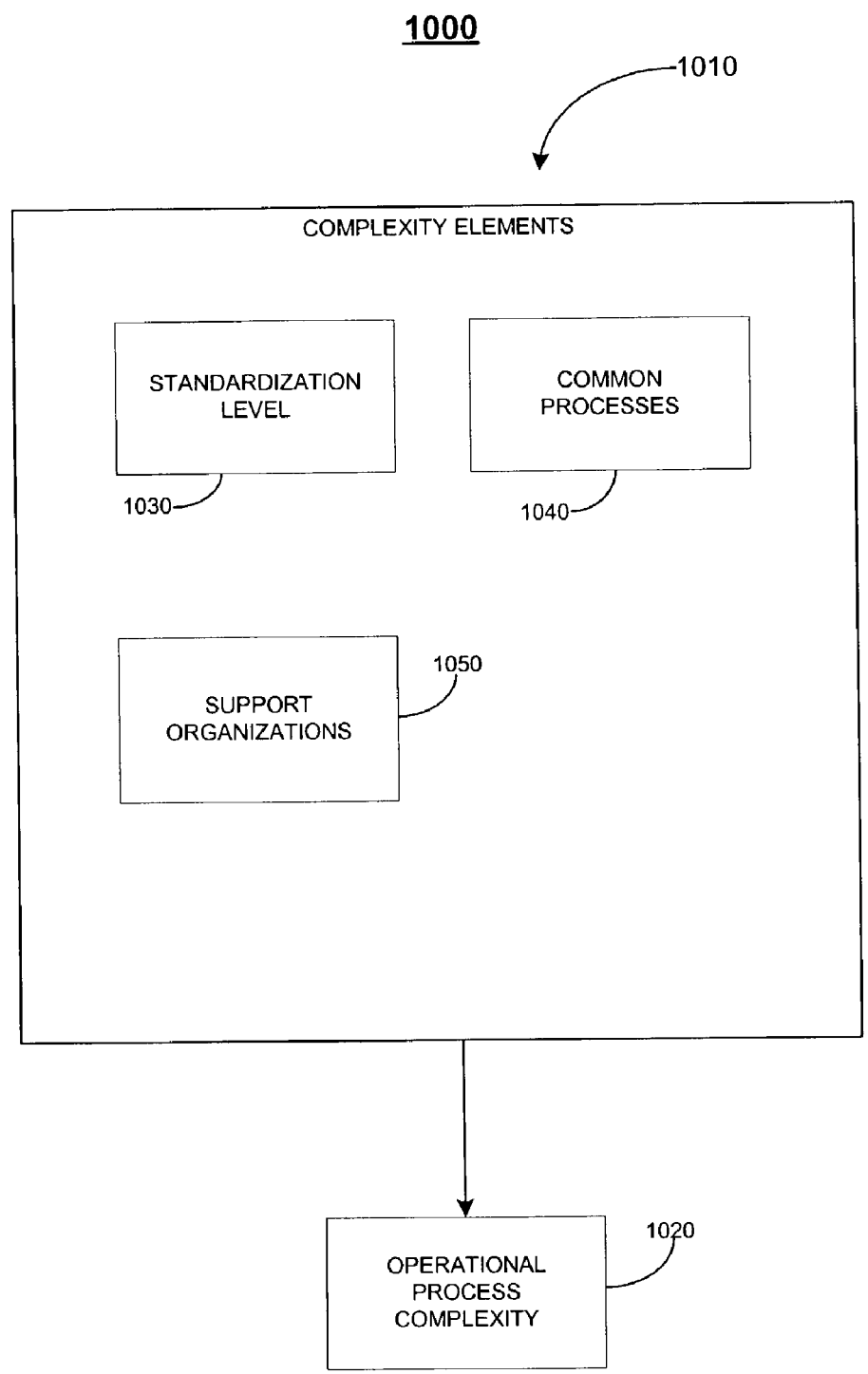

FIG. 10 shows example of complexity elements 1010 that may be included in a determination of operational process complexity 1020. The operational process complexity element 1020 describes the complexity of processes used that are not related to any particular element such as a mainframe, mid-range computing, or desktop environment. Complexity elements 1010 include a standardization level complexity element 1030, a common processes complexity element 1040, and a support organizations complexity element 1050.

The standardization level complexity element 1030 describes the level of standardized processes that are used in the computing environment. When a computing environment is certified by the ISO or has a management system in place that is otherwise certified, a low complexity group is associated with the standardization level complexity element 1030. When a computing environment has some level of standardized operating procedures in place, a medium complexity group is associated with the standardization level complexity element 1030. When a computing environment has no standardized operating procedures in place, a high complexity group is associated with the standardization level complexity element 1030.

The common processes complexity element 1040 describes the degree to which tasks use a common procedure or process. A common procedure or process refers to an operational procedure or process that is used to accomplish more than one operational task or activity. In contrast, a distinct procedure or process is used to perform only one operational task or activity. When 90 percent or more of operational tasks or activities are performed using a common procedure or process, a complexity group of low is associated with common processes complexity element 1040. When more than 50 percent and less than 90 percent of operational tasks or activities are performed using a common procedure or process, a complexity group of medium is associated with the common processes complexity element 1040. When 50 percent or less than 50 percent of operational tasks or activities are performed by a common procedure or process, a complexity group of high is associated with the common processes complexity element 1040.

The support organizations complexity element 1050 describes the number of support organizations that are used to provide support to the computing environment. A computing environment may involve the use of one or more support organizations with each support organization responsible for providing support for particular aspects of the computing environment. For example, support organizations may provide support to a computing environment based on particular hardware, functions or vendors. A computing environment may have one support organization that provides support for mainframe hardware and operating systems, another support organization that provides support for a mainframe database system, and yet another support organization that provides support for midrange hardware, operating systems, and mid-range database systems. When the number of support organizations is one, a complexity group of low is associated with the support organizations complexity element 1050. When the number of support organizations is more than one and less than five, a complexity group of medium is associated with the support organizations complexity element 1050. When the number of support organizations is five or more, a complexity group of high is associated with the support organizations complexity element 1050.

Figure 11:
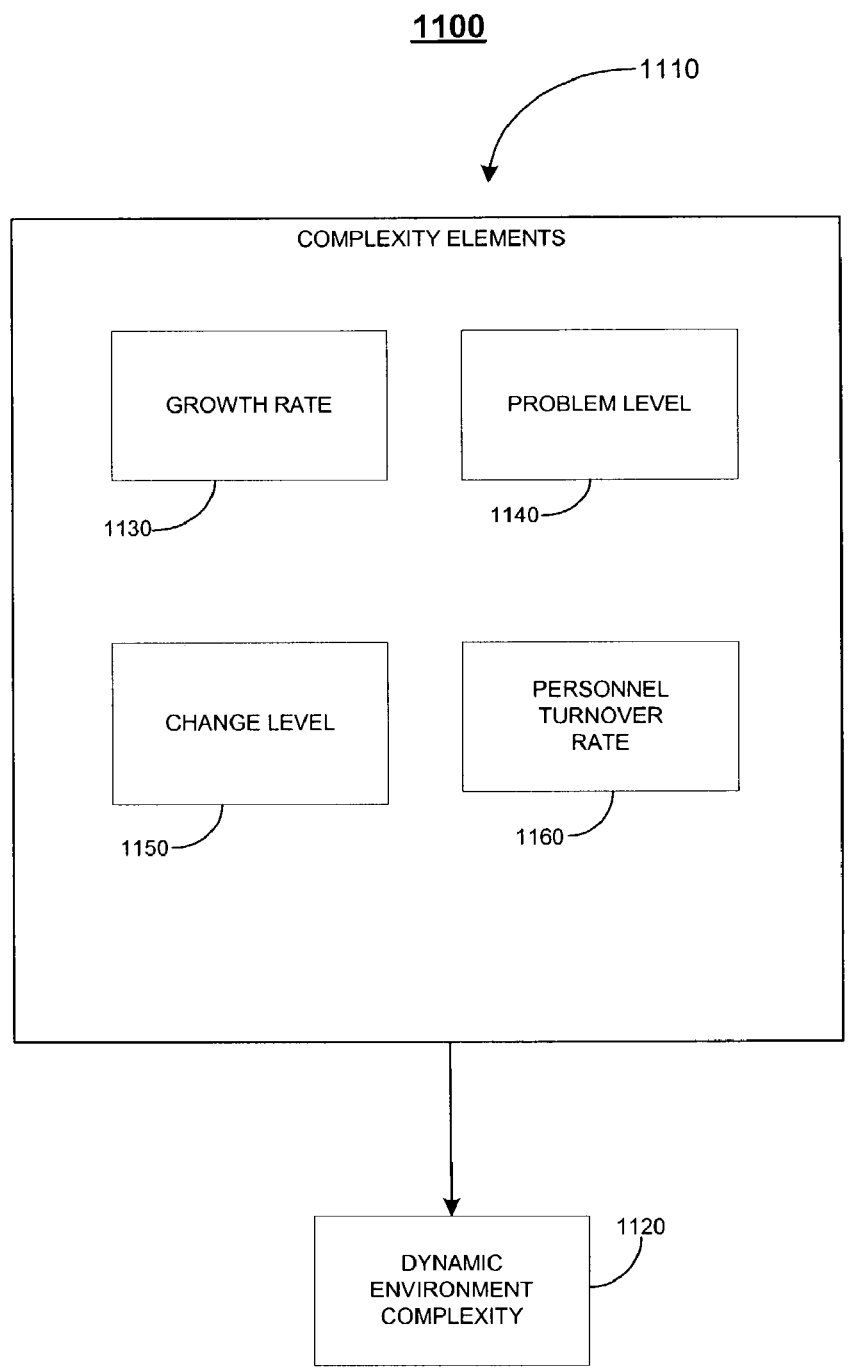

FIG. 11 shows example complexity elements 1110 that may be included in a determination of dynamic environment complexity 1120. The dynamic environment complexity 1120 describes the degree of complexity brought about by changes in the environment and the speed at which the computing environment is growing. Complexity elements 1110 include a growth rate complexity element 1130, a problem level complexity element 1140, a change level complexity element 1150, and a personnel turnover rate complexity element 1160.

The growth rate complexity element 1130 describes the annual growth rate of the computing environment. The annual growth rate may be measured based on the growth of the number of servers included in the computing environment, the amount of disk space or processing capacity provided, the number of user accounts or customers, or other measures of the size of the computing environment. When the growth rate of the computing environment is less than 5 percent per year, a complexity group of low is associated with the growth rate complexity element 1130. When the growth rate of the computing environment is at least 5 percent and less than 20 percent per year, a complexity group of medium is associated with the growth rate complexity element 1130. When the growth rate of the computing environment is at least twenty percent per year, a complexity group of high is associated with the growth rate complexity element 1130. Other implementations may use measures of computing environment growth rate other than an annual growth rate. For example, some implementations may use a monthly growth rate or a growth rate over a five-year period.

The problem level complexity element 1140 may describe the number of problems that are reported per month in the computing environment. These problems may be reported through a call-in center or otherwise by a user (e.g., through an electronic mail message), a computer system operator who observed a problem, or an alert or message provided by a computing device or component. When the number of problems per month is less than 100, a complexity group of low is associated with the problem level complexity element 1140. When the number of problems is at least 100 and less than 1,000 per month, a complexity group of medium is associated with the problem level complexity element 1140. When the number of problems is at least 1,000 per month, a complexity group of high is associated with the problem level complexity element 1140.

The change level complexity element 1150 describes the number of changes per month in the computing environment. When the number of changes per month is less than 100, a complexity group of low is associated with the change level complexity element 1150. When the number of changes per computing environment per month is at least 100 and less than 500, a complexity group of medium is associated with the change level complexity element 1150. When the number of changes per computing environment is at least 500 per month, a complexity group of high is associated with the change level complexity element 1150. Some implementations may use different measures of the change level complexity, for example, they may measure the number of changes per month per server in the computing environment.

The personnel turnover rate complexity element 1160 describes the turnover rate of personnel used to support the computing environment. When the turnover rate is less than two percent per year, a complexity group of low is associated with the personnel turnover rate complexity element 1160. When the turnover rate is at least two percent and less than five percent, a complexity group of medium is associated with the personnel turnover rate complexity element 1160. When the turnover rate is at least five percent, a complexity group of high is associated with the personnel turnover rate complexity element 1160. In some implementations, the problem level complexity element 1140 and the change level complexity element 1150 may each be associated with a higher across-element statistical weight than the across-element statistical weight associated with the personnel turnover rate complexity element 1160.

Figure 12:
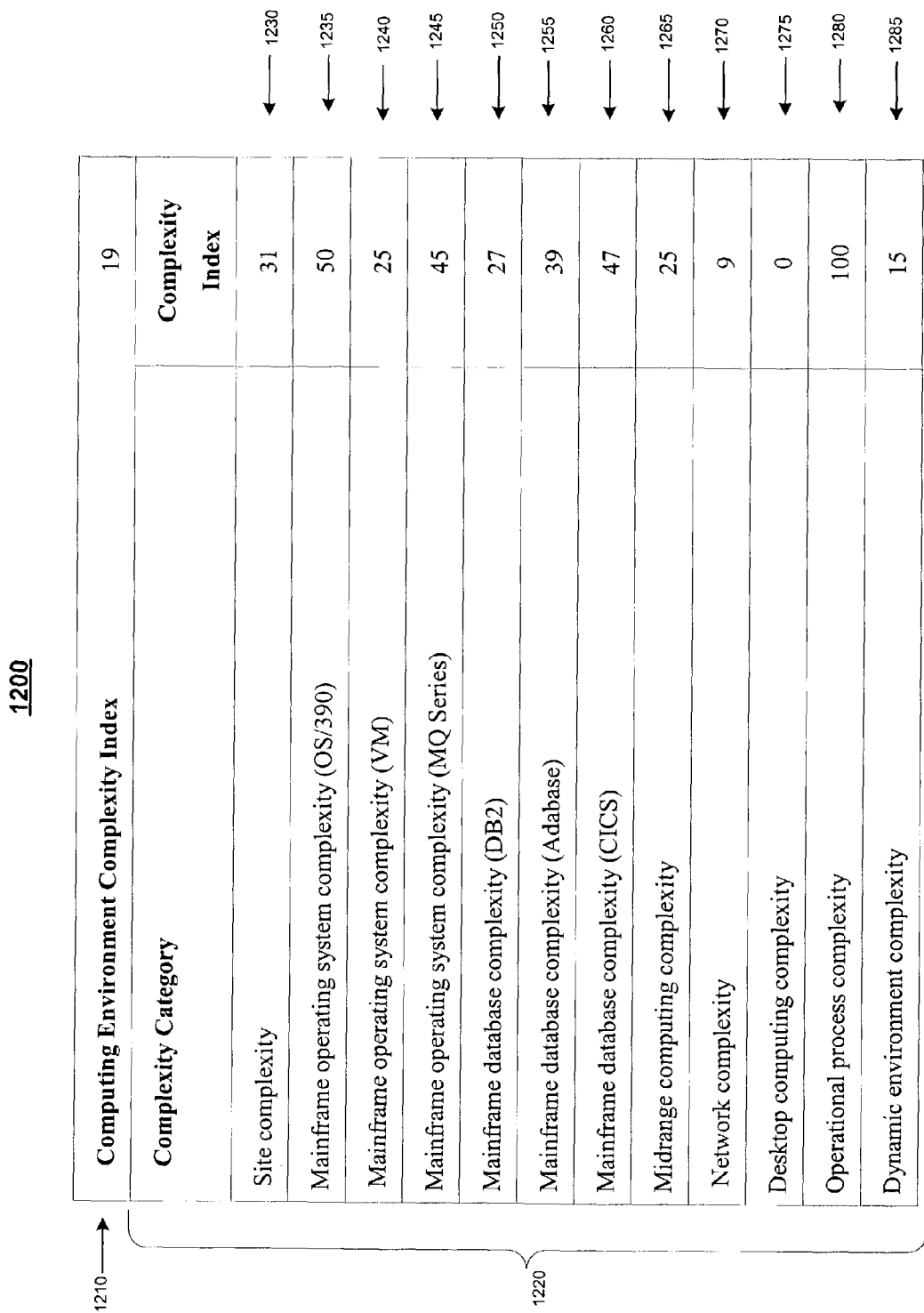

FIG. 12 shows a result 1200 of determining the complexity of a computing environment. The result 1200 includes a computing environment complexity index 1210 of nineteen and complexity indices associated with various complexity categories 1220. Each complexity category includes one or more complexity elements.

The site complexity 1230 includes a complexity index of thirty-one which may be based on, for example, the determination of the quantity of the computing elements described previously with respect to FIG. 4.

The mainframe operating system complexity for operating system OS/390 1235 includes a complexity index of fifty. The complexity index may be based, for example, on the determination of the quantity of the complexity elements as described previously with respect to FIG. 5.

The mainframe operating system complexity for the operating system VM (by IBM Corporation) 1240 is twenty-five. The complexity index may be based, for example, on the determination of the quantity of the complexity elements as described previously with respect to FIG. 5.

The mainframe operating system complexity for the MQ series software by IBM Corporation 1245 is forty-five. MQ series is messaging software for sending transactions between a CICS data management system and a DB2 data management system. Although MQ series is not an operating system, the operating system complexity factors, such as the complexity element described previously with respect to FIG. 5, may provide a level of complexity for such software.

The mainframe database complexity for the database DB2 1250 is twenty-seven. The DB2 mainframe database complexity includes a complexity index that may be based, for example, on the determination of the quantity of the computing elements described previously with respect to FIG. 6.

The mainframe database complexity for Adabase 1255 is thirty-nine. The Adabase mainframe database complexity includes a complexity index that may be based, for example, on the determination of the quantity of the computing elements described previously with respect to FIG. 6.

The mainframe database complexity for CICS 1260 is forty-seven. The CICS mainframe database complexity includes a complexity index that may be based, for example, on the determination of the quantity of the computing elements described previously with respect to FIG. 6.

The mid-range computing complexity 1265 is twenty-five. The mid-range computing complexity may be based on, for example, the determination of the quantity of the complexity elements described previously with respect to FIG. 7.

The network complexity 1270 is nine. The network complexity may be based on, for example, the determination of the quantity of the complexity elements described previously with respect to FIG. 8.

The desktop computing complexity 1275 is zero. No desktop computers are supported by the computing environment.

The operational process complexity 1280 is one hundred. The operational process complexity may be based on, for example, the determination of the quantity of the complexity elements described previously with respect to FIG. 10.

The dynamic environment complexity 1285 is fifteen. The dynamic environment complexity may be based on, for example, the determination of the quantity of the complexity elements described previously with respect to FIG. 11.

When more than one mainframe operating system is used in the computing environment, one or more complexity elements may be determined for each operating system.

Here, complexity categories 1235, 1240, and 1245 group complexity elements that relate to different mainframe operating systems.

Similarly, when more than one mainframe data management system is used in the computing environment, one or more complexity elements may be determined for each data management system. Here, complexity categories 1250, 1255, and 1260 group complexity elements that relate to different mainframe data management systems.

Figure 13:
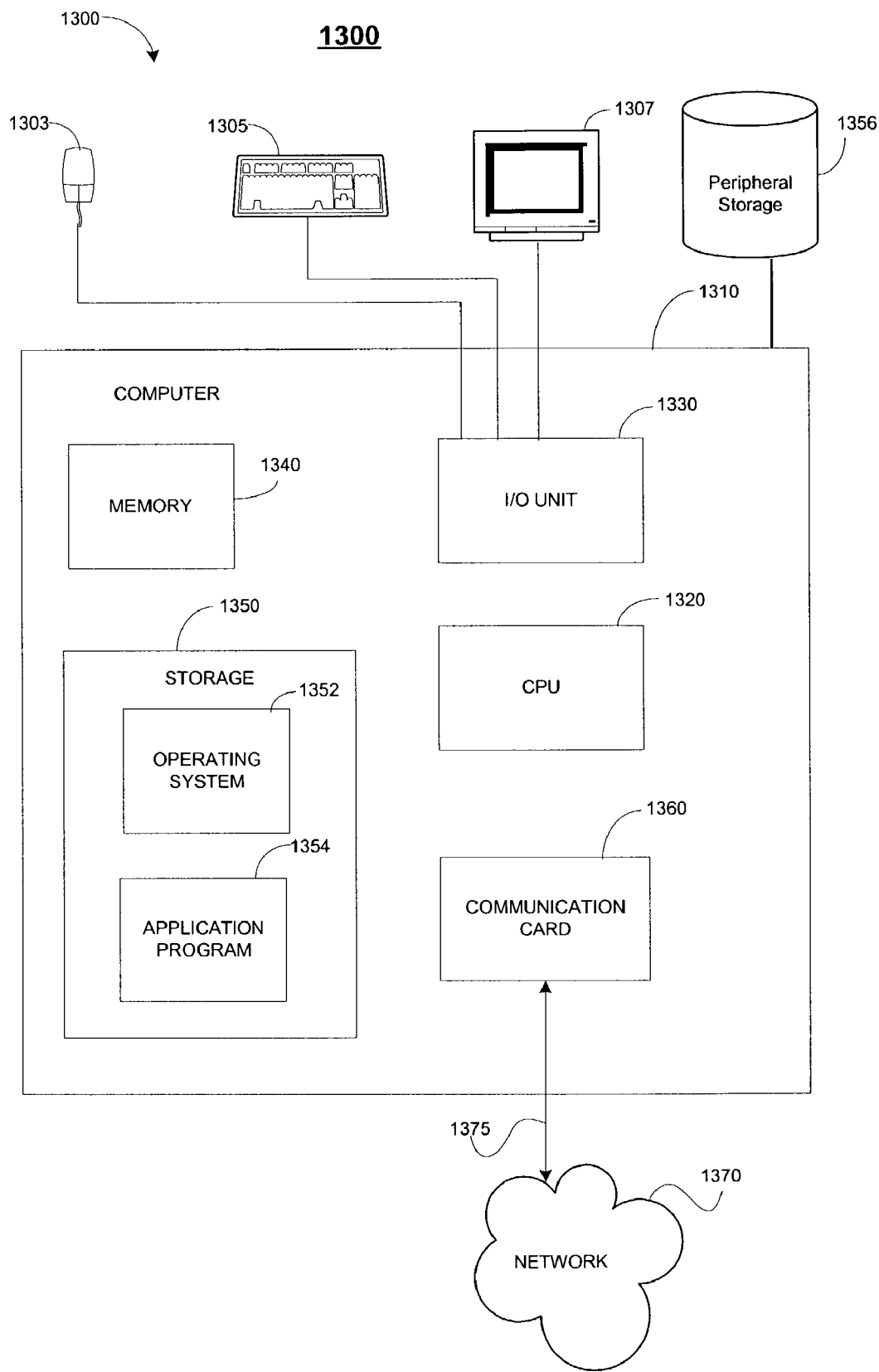
FIG. 13 is a block diagram of a system for determining the complexity of a computing environment.

Referring to FIG. 13, a programmable system 1300 for determining the complexity of a computing environment includes a variety of input/output (I/O) devices (e.g., mouse 1303, keyboard 1305, and display 1307) and a computer 1310 having a central processor unit (CPU) 1320, an I/O unit 1330, a memory 1340, and a data storage device 1350. Data storage device 1350 may store machine-executable instructions, data, and various programs such as an operating system 1352 and one or more application programs 1354 for implementing a process for determining the complexity of a computing environment, all of which may be processed by CPU 1320. Each computer program may be implemented in a high-level procedural or object-oriented programming language, or in assembly or machine language if desired; and in any case, the language may be a compiled or interpreted language. Data storage device 1350 may be any form of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM).

System 1300 may include one or more peripheral online storage devices 1356 for storing complexity data. Peripheral online storage device 1356 may use any storage media (including magnetic, optical or solid state storage media) or any type of storage device (including a drive, a microdrive, a compact disc (CD), a recordable CD (CD-R), a rewriteable CD (CD-RW), a flash memory, or a solid-state floppy disk card (SSFDC)).

System 1300 also may include a communications card or device 1360 (e.g., a modem and/or a network adapter) for exchanging data with a network 1370 using a communications link 1375 (e.g., a telephone line, a wireless network link, a wired network link, or a cable network). Other examples of system 1300 may include a handheld device, a workstation, a server, a device, a component, other equipment, or some combination of these capable of responding to and executing instructions in a defined manner. Any of the foregoing may be supplemented by, or incorporated in, ASICs (application-specific integrated circuits).

Implementations may include a method or process, an apparatus or system, or computer software on a computer medium. It will be understood that various modifications may be. For example, the techniques described still could be used if steps of the disclosed techniques were performed in a different order and/or if components in the disclosed systems were combined in a different manner and/or replaced or supplemented by other components.

Other implementations are within the scope of the following claims.

What is claimed is:

1. A computer-implemented method for determining the complexity of a computing environment, the method comprising:
   receiving at least one quantity associated with a first element associated with the computing environment;

based on the received at least one quantity, associating the first element with a complexity group that descriptively associates a group of quantities with a level of complexity;

based on the complexity group associated with the first element, applying a first statistical weight to at least one of the received at least one quantity to produce an intermediate result;

applying a second statistical weight to at least one of the received at least one quantity and the intermediate result to produce a complexity value for the first element; and determining a complexity value for the computing environment using the complexity value for the first element and complexity values for one or more other elements associated with the computing environment.

2. The computer-implemented method of claim 1 wherein the first statistical weight is a within-element statistical weight that reflects the importance of the first element itself and the second statistical weight is an across-element statistical weight that reflects the importance of the first element relative to other elements.

3. The computer-implemented method of claim 1 wherein the complexity group is one of low, medium, or high.

4. The computer-implemented method of claim 1 wherein the first element is associated with one or more of site complexity, mainframe operating system complexity, mainframe database complexity, mid-range computing complexity, network complexity, desktop computing complexity, operational process complexity, and dynamic environment complexity.

5. The computer-implemented method of claim 1 further comprising:

receiving at least one quantity associated with a second element associated with the computing environment;

based on the received at least one quantity associated with the second element, associating the second element with a second complexity group that descriptively associates a group of quantities with a level of complexity;

based on the second complexity group associated with the second element, applying a third statistical weight to at least one of the received at least one quantity associated with the second element to produce an intermediate result;

applying a fourth statistical weight to at least one of the received at least one quantity associated with the second element and the intermediate result to produce a complexity value for the second element; and determining a complexity value for the computing environment using at least the complexity value for the first element and the complexity value for the second element.

6. A system for determining the complexity of a computing environment, the system comprising a processor connected to a storage device and one or more input/output devices, wherein the processor is configured to:

receive at least one quantity associated with a first element associated with the computing environment;

based on the received at least one quantity, associate the first element with a complexity group that descriptively associates a group of quantities with a level of complexity;

based on the complexity group associated with the first element, apply a first statistical weight to at least one of the received at least one quantity to produce an intermediate result;

apply a second statistical weight to at least one of the received at least one quantity and the intermediate result to produce a complexity value for the first element; and determine a complexity value for the computing environment using the complexity value for the first element and complexity values for one or more other elements associated with the computing environment.

7. The system of claim 6 wherein the first statistical weight is a within-element statistical weight that reflects the importance of the first element itself and the second statistical weight is an across-element statistical weight that reflects the importance of the first element relative to other elements.

8. The system of claim 6 wherein the complexity group is one of low, medium, or high.

9. The system of claim 6 wherein the first element is associated with one or more of site complexity, mainframe operating system complexity, mainframe database complexity, mid-range computing complexity, network complexity, desktop computing complexity, operational process complexity, and dynamic environment complexity.

10. The system of claim 6 wherein the processor is further configured to:

receive at least one quantity associated with a second element associated with the computing environment;

based on the received at least one quantity associated with the second element, associate the second element with a second complexity group that descriptively associates a group of quantities with a level of complexity;

based on the second complexity group associated with the second element, apply a third statistical weight to at least one of the received at least one quantity associated with the second element to produce an intermediate result;

apply a fourth statistical weight to at least one of the received at least one quantity associated with the second element and the intermediate result to produce a complexity value for the second element; and determine a complexity value for the computing environment using at least the complexity value for the first element and the complexity value for the second element.

11. A computer-readable medium having embodied thereon a computer program, when executed, is configured to determine the complexity of a computing environment, the computer-readable medium comprising one or more code segments configured to:

receive at least one quantity associated with a first element associated with the computing environment;

based on the received at least one quantity, associate the first element with a complexity group that descriptively associates a group of quantities with a level of complexity;

based on the complexity group associated with the first element, applying a first statistical weight to at least one of the received at least one quantity to produce an intermediate result;

apply a second statistical weight to at least one of the received at least one quantity and the intermediate result to produce a complexity value for the first element; and determine a complexity value for the computing environment using the complexity value for the first element and complexity values for one or more other elements associated with the computing environment.

12. The computer-readable medium of claim 11 wherein the first statistical weight is a within-element statistical weight that reflects the importance of the first element itself and the second statistical weight is an across-element statistical weight that reflects the importance of the first element relative to other elements.

13. The computer-readable medium of claim 11 further comprising one or more code segments configured to:
   determine the complexity values for each of the one or more elements, and
   determine the complexity value for the computing environment using the complexity values determined for each of the one or more elements.

14. The computer-readable medium of claim 11 further comprising one or more code segments configured to associate a quantity that is associated with the first element with a complexity group that descriptively associates a group of quantities with a level of complexity.

15. The computer-readable medium of claim 11 wherein the first element is associated with one or more of site complexity, mainframe operating system complexity, mainframe database complexity, mid-range computing complexity, network complexity, desktop computing complexity, operational process complexity, and dynamic environment complexity.

16. The computer-readable medium of claim 11 wherein the one or more code segments are further configured to:
   receive at least one quantity associated with a second element associated with the computing environment;
   based on the received at least one quantity associated with the second element, associate the second element with a second complexity group that descriptively associates a group of quantities with a level of complexity;
   based on the second complexity group associated with the second element, apply a third statistical weight to at least one of the received at least one quantity associated with the second element to produce an intermediate result;
   apply a fourth statistical weight to at least one of the received at least one quantity and the intermediate result to produce a complexity value for the second element; and
   determine a complexity value for the computing environment using at least the complexity value for the first element and the complexity value for the second element.

* * * * *